Figure 1:
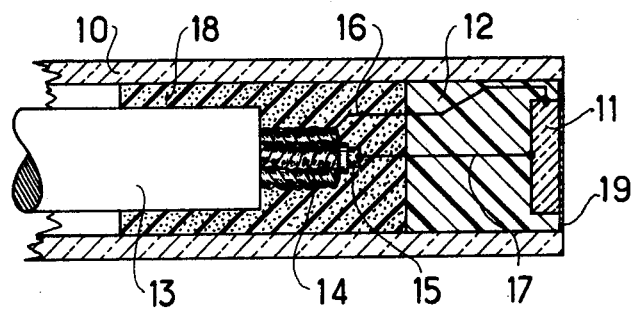

United States Patent
Peronneau et al.

[15] 3,661,146
[45] May 9, 1972

[54] TRANSDUCER ARRANGEMENT FOR MEASURING BLOOD FLOW

[72] Inventors: Pierre Peronneau, Paris; Fernand Leger, Gif-sur-Yvette, both of France

[73] Assignees: Compagnie Generale D'Electricite, Paris; Agence Nationale de Valorisation de la Recherche (Anvar), Recherche (Anvar), France

[22] Filed: Dec. 31, 1969

[21] Appl. No.: 889,401

[30] Foreign Application Priority Data

Dec. 31, 1968 France..................................183135

[52] U.S. Cl...........................128/2.05 F, 73/67.8, 128/2 V, 310/8.2
[51] Int. Cl. .......................................................A61b 5/02
[58] Field of Search.....................128/2.05 F, 2.05 V, 2.05 P, 128/2.05 N, 2.05 A, 2.05 R, 2.06 E, 24 A, 2 V; 73/194 A, 67.8; 340/8 RT, 8 MM; 310/8.2

[56] References Cited

UNITED STATES PATENTS

| 3,376,438 | 4/1968 | Colbert....................................310/8.2 |
| 3,430,625 | 3/1969 | McLeod, Jr. ........................128/2.05 F |
| 3,443,433 | 5/1969 | Liston et al..............................73/194 |
| 3,387,604 | 6/1968 | Erikson..................................128/24 A |
| 3,409,869 | 11/1968 | McCool et al. .....................340/8 MM |
| 2,913,602 | 11/1959 | Joy..........................................310/8.3 |
| 3,403,271 | 9/1968 | Lobdell et al..........................310/8.2 |
| 2,946,904 | 7/1960 | Renaut....................................310/8.2 |
| 3,270,330 | 8/1966 | Weinberg...............................310/8.2 |
| 3,178,681 | 4/1965 | Horsman et al........................310/8.2 |
| 2,984,756 | 5/1961 | Bradfield ............................340/8 MM |

FOREIGN PATENTS OR APPLICATIONS

| 166,108 | 11/1964 | U.S.S.R. ................................128/2.06 |

OTHER PUBLICATIONS

Herrick, J. F. et al., IRE Transactions on Medical Electronics, 1959, pp. 195– 204

Timm, G. W., et al., IEEE Transactions on Bio-Medical Engineering, Oct., 1970, p. 352

Biotronex Laboratory Catalogue, Mar., 24, 1967, 4 pages

*Primary Examiner*—Richard A. Gaudet
*Assistant Examiner*—Kyle L. Howell
*Attorney*—Craig, Antonelli, Stewart and Hill

[57] ABSTRACT

Perivascular transducer whose piezoelectric plate is bordered on one side thereof by a reflecting and/or absorbing mass and which is equipped with two plastic bands adapted to form a collar around the vessel which is intended to be subjected to the measurement.

1 Claim, 2 Drawing Figures

TRANSDUCER ARRANGEMENT FOR MEASURING BLOOD FLOW

The present invention relates to a transducer of the piezoelectric type which is designed for measuring the speed and flow of blood by ultrasonic probing or examination. It is known that blood flow can be measured with extreme accuracy by the measurement of ultrasonic waves backscattered from moving interfaces since such waves exhibit the familiar Doppler shift in frequency which has been used for many years to detect velocity in other fields. Since blood is one of the most effective backscattering media, ultrasonic blood flow velocity sensors have been found to be most advantageous for diagnosis of certain problems.

Already known in the art are ultrasonic pick-up and receiving instruments of this type comprising a small plate made from piezoelectric ceramic material, enclosed within, or covered by, a plastic material, which is connected to electrical detection apparatus by means of two conductors connected respectively to two surfaces of the small piezoelectric plate and adapted to transmit either excitation currents to the plate when the latter is operative as an ultrasonic emitter, or currents delivered by the plate operating as an echo receiver.

In order to obtain the greatest possible sensitivity of such a transducer, it is indispensable that only a single one of the surfaces thereof be acoustically coupled to the propagation medium and subjected to expansions or vibrations with respect to the opposite surface, which latter surface must be removed as much as possible from any mechanical excitation. In fact, if the two surfaces must become excited, the ideal condition would be a symmetrical excitation, yet this is a condition which is impossible to attain in a simple and reliable manner. Rather one would find in practice variable phases on the two surfaces, and hence a reduced sensitivity and nonreproducible or measurable results would be provided by the transducer.

It is important, therefore, that the acoustic transmission be made as perfectly as possible between one surface of the plate which is turned toward the propagation medium and that, by contrast, the other surface be disengaged acoustically from the propagation medium as completely as possible.

This is the reason why, in accordance with the present invention, in a device for measuring blood flow comprising a piezoelectric ceramic plate, one of the surfaces of the plate which is not turned toward the propagation medium is in contact with a mass of material assuring an acoustic disengagement with respect to the propagation medium.

According to another characteristic of the present invention, this mass is, or consists of, a material having properties of partial absorption and partial reflection, for example rubber, foam rubber, or the like.

According to a further characteristic of the present invention, this mass is, or consists of, a material having an almost total absorption property, for example resin charged with metallic particles, or the like.

According to yet another characteristic of the present invention, the piezoelectric plate is fixed at or secured to, the end of a catheter and the mass is placed against the surface of the plate which is turned toward the inside of the catheter.

According to a still further characteristic of the present invention, in a perivascular device comprising a cap open toward the propagation medium, the piezoelectric plate is enclosed with a material assuring a good acoustic transmission on the surface which is turned toward the opening, whereas the opposite surface thereof is in contact with a ball made from a material such as described above assuring an acoustic disengagement with respect to the propagation medium and provided at the bottom of this cap.

According to another characteristic of the present invention, a perivascular device formed in a cap is glued onto a band of fabric, for example Dacron, the band having two parts that are aligned on both sides of the opening of the cap for securing the cap to the vessel to be monitored.

Figure 2:
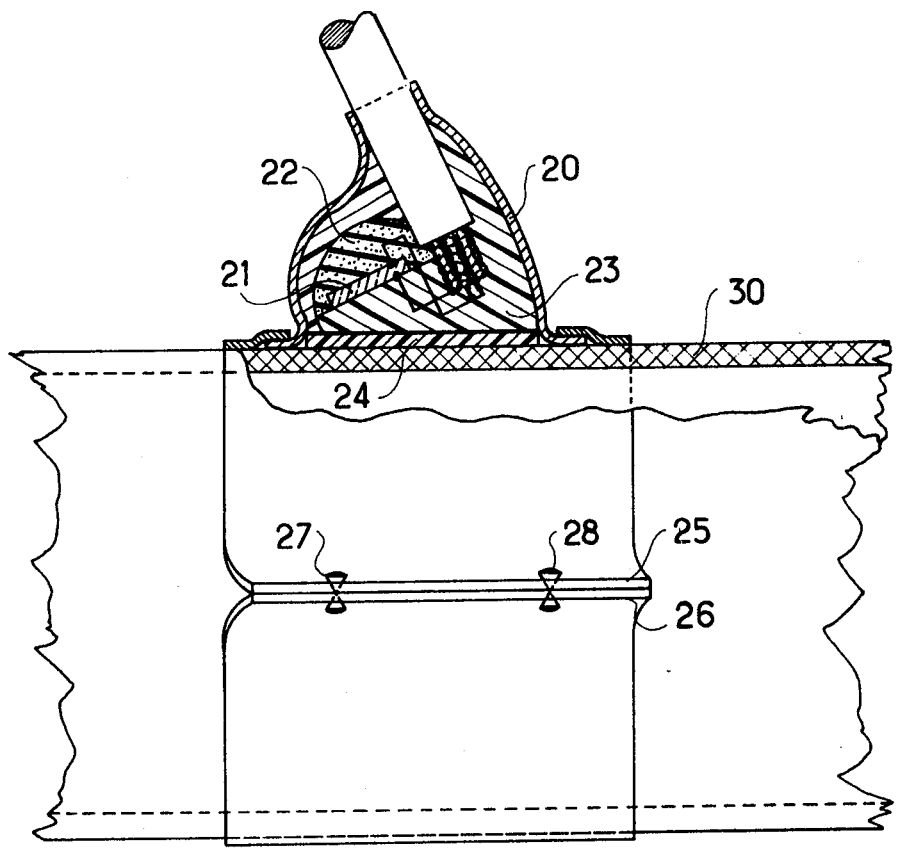

The present invention will be further described hereinafter with reference to the accompanying drawing, wherein FIG. 1 is a cross-sectional view, on an enlarged scale, relative to one embodiment of a device according to the present invention, which is mounted at the end of a catheter, and FIG. 2 is a cross-sectional view of a perivascular device according to the present invention.

In FIG. 1, a catheter 10 is provided at the end thereof with a piezoelectric plate 11, the surface of which turned toward the inside of the catheter 10 is in contact with a mass formed from resilient material 12, for example rubber. The catheter 10 contains a coaxial cable 13 whose outer conductor 14 is connected to one of the surfaces of the plate 11 by means of a wire 16, and the inner conductor 15 thereof is connected to the other surface of the plate 11 by means of a wire 17. The coaxial cable 13 is advantageously made stationary within the catheter 10 by means of an epoxy resin 18. A varnish film 19 covers the surface in front of the ceramic plate 11.

The piezoelectric ceramic plate 11 may also be inclined, if desired, with respect to the axis of the catheter; this will allow for the sensitive field or radiation field of the ceramic material to cover the section of the vessel without resorting to a centering device.

Looking now to FIG. 2, which illustrates an embodiment forming a perivascular device, disposed in a stationary manner within a cap 20 is a piezoelectric ceramic plate 21 between a rubber mass in the form of a ball 22 in the bottom of this cap and a plastic mass 23, which may be any suitable material, for example the material known by the name ALTUGLAS, facing toward the opening of the cap. This opening is equipped or provided over the entire extension thereof with a sole 24 also made for example from ALTUGLAS which may be plated against the wall 30 of a vessel intended to be subjected to a measurement. The elements 20, 23, 24 may also constitute a single mass or unitary structure.

In certain cases, the impedance match with the vascular wall is assured by means of a mass of gel (not shown) placed upon the emitting surface of the ceramic plate 21.

The fixing of the transducer on the vessel is advantageously accomplished with the aid of two portions of a band, for example made from Dacron, on which the transducer is fixed, for example by gluing. One of these portions or strands is visible at 25 passing in front of the vessel, and the other one is visible at 26 returning from behind the vessel. In order to assure the connection with the vessel, the two portions are sutured together at 27 and 28, thus forming a sort of bracelet around the vessel.

This particular form of construction is very advantageous since it allows for establishing the connection between the pick-up and the vessel with the smallest traumatization possible. On a band one may fix either a single pick-up device or transducer which serves alternately as emitter and as receiver, or two pick-up devices, being specific to each function.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What we claim is:

1. Perivascular transducer arrangement comprising at least one transducer mounted within a cap open at one side and being formed by a piezoelectric plate, a body formed of a first material assuring a good acoustic transmission being disposed between one side of said piezoelectric plate and the opening of the cap, the opposite side of said plate within the cap being in contact with a body of material providing acoustic disengagement with respect to acoustic waves directed to said one side of said plate, said cap being secured to a band having two portions aligned on respective sides of the opening of the cap and adapted to be closed in the form of a collar around a vessel, electrical lead means extending through said cap and connected to said piezoelectric plate, said first material being a plastic mass and said material providing acoustic dis-engagement being a partial reflector and partial absorber of acoustic waves.

* * * * *